United States Patent [19]

Brew

[11] Patent Number: 5,696,980
[45] Date of Patent: Dec. 9, 1997

[54] MACHINE TRANSLATION SYSTEM UTILIZING BILINGUAL EQUIVALENCE STATEMENTS

[75] Inventor: Christopher Hardie Brew, Edinburgh, Scotland

[73] Assignee: Sharp Kabushiki Kaisha, Osaka, Japan

[21] Appl. No.: 54,440

[22] Filed: Apr. 27, 1993

[30] Foreign Application Priority Data

Apr. 30, 1992 [GB] United Kingdom ............... 9209346

[51] Int. Cl.$^6$ .................................................. G06F 17/28
[52] U.S. Cl. ................................................ 395/752; 395/759
[58] Field of Search ........................ 364/419.02, 419.08, 364/419.03; 395/752, 759, 753

[56] References Cited

U.S. PATENT DOCUMENTS

| | | | |
|---|---|---|---|
| 4,864,503 | 9/1989 | Tolin | 364/419.02 |
| 5,060,155 | 10/1991 | Van Zuijlen | 364/419.08 |
| 5,083,268 | 1/1992 | Hemphill et al. | 364/419.08 |
| 5,088,038 | 2/1992 | Tanaka et al. | 364/419.02 |
| 5,128,865 | 7/1992 | Sadler | 364/419.02 |

FOREIGN PATENT DOCUMENTS

| | | |
|---|---|---|
| 0387876 | 9/1990 | European Pat. Off. |
| 0403057 | 12/1990 | European Pat. Off. |
| 4107769 | 4/1992 | Japan. |

OTHER PUBLICATIONS

M. Yokota et al., "Japanese–English Translation of Weather Reports by Isobar", Jun. 1984, The transactions of the IECE of Japan, vol. E67, No. 6, pp. 315–322.

Hiroaki Kitano et al., "A Massively Parallel Model of Speech–To–Speech Dialog Translation: A Step Toward Interpreting Telephony", Sep. 1989, vol. 1 pp. 198–201, Proceedings of the European Conference on Speech Communication and Technology–Eurospeech 89.

*Primary Examiner*—Robert A. Weinhardt

[57] ABSTRACT

A machine translation system which operates by analyzing a source text to deduce information about the usage and meaning of the words of a source language text as they occur in context. This information is passed to an equivalencing module, which determines a set of equivalent target language words from which may be constructed a target language text by a generation module. The generation module has internal structure, including a tree construction module and a constraint checking module. The two modules operate in parallel. The tree constructor builds legal target language structures from which the translated text may be extracted. The constraint checker ensures that each structure which is built will be part of a global structure that uses all the words which appear in the input to the generation module.

6 Claims, 16 Drawing Sheets

| | |
|---|---|
| Mary | category:np<br>index: #1<br>restrictions: named(#1, mary) |
| Frances | category:np<br>index: #2<br>restrictions:named(#2, frances) |
| likes | category: s\np1/np2<br>index: # 3<br>restrictions: liking(#3)<br>: index(np1, #4)<br>: index(np2, #5)<br>: experiencer(#3, #4)<br>: theme(#3, #5) | a → a/b   b   (Rule for Rightward or Forward Combination)
a → b   a\b   (Rule for Leftward or Backward Combination)

| | |
|---|---|
| Mary ⟵ SG1 | category: np<br>index: #1<br>restrictions: named(#1, mary) |
| Frances ⟵ SG2 | category: np<br>index: #2<br>restrictions: named(#2, frances) |
| likes ⟵ SG3 | category: s\np$_1$/np$_2$<br>index: #3<br>restrictions: liking(#3)<br>  : index(np$_1$, #1)<br>  : index(np$_2$, #2)<br>  : experiencer(#3, #2)<br>  : theme(#3, #2)<br>  : named(#1, mary)<br>  :named(#2, frances) ⟵ BG |

FIG. 9
PRIOR ART

| French verb "plaire" + "à" | English verb "like" |
|---|---|
| category: s\np$_1$/pp(à)<br>index: # 3<br>restrictions: plaire(#3)<br>: index(np$_1$, #1)<br>: experiencer(#3, #2)<br>: theme(#3, #1)<br>------------------------------<br>category:pp(à)/np$_2$<br>restrictions: index(np$_2$, #2) | category: s\np4/np5<br>index: # 3<br>restrictions: liking(#3)<br>: index(np$_4$, #2)<br>: index(np$_5$, #1)<br>: experiencer(#3, #2)<br>: theme(#3, #1) |

FIG. 10
PRIOR ART

| French "Marie" + "Françoise" | English "Mary" + "Frances" |
|---|---|
| category: np<br>index: # 1<br>restrictions: nommé(#1, marie) | category: np<br>index: # 1<br>restrictions: named(#1, mary) |
| category: np<br>index: # 1<br>restrictions: nommé(#1, françoise) | category: np<br>index: # 1<br>restrictions: named(#1, frances) |

FIG. 11
PRIOR ART

| French | English |
|---|---|
| category: $np_1$<br><br>index: #1<br><br>restrictions: nommé(#1, marie) | category: $np_3$<br><br>index: #1<br><br>restrictions: named(#1, mary) |
| category: $np_2$<br><br>index: #2<br><br>restrictions: nommé(#2, françoise) | category: $np_4$<br><br>index: #2<br><br>restrictions: named(#2, frances) |
| category: $s\backslash np_1/pp(à)$<br><br>index: #3<br><br>restrictions: plaire(#3)<br>    : index($np_1$, #1)<br>    : experiencer(#3, #1)<br>    : theme(#3, #2)<br>    : nommé(#2, françoise)<br><br>----------------------------------<br><br>category: $pp(à)/np_2$<br><br>restrictions: index($np_2$, #1)<br>    : nommé(#1, marie) | category: $s\backslash np_4/np_3$<br><br>index: #3<br><br>restrictions: liking(#3)<br>    : index($np_3$, #2)<br>    : index($np_4$, #1)<br>    : experiencer(#3, #1)<br>    : theme(#3, #2)<br>    : named(#1, mary)<br>    : named(#2, frances) |

FIG. 12
PRIOR ART

Input: [np s\np/np np]

Stack: []

TOP → BOTTOM

Input: [s\np/np np]

Stack: [np]

TOP → BOTTOM

Input: [np]

Stack: [s\np/np np]

TOP → BOTTOM

Input: []

Stack: [np s\np/np np]

TOP → BOTTOM

Input: []

Stack: [s\np np]

TOP → BOTTOM

Input: []

Stack: [s]

TOP → BOTTOM

% shiftreduce(Stack,Output,StringIn,StringOut).

shiftreduce([Sign],Sign,[], []). % Clause A shiftreduce([A,B | Stack],Sign, StringIn, StringOut) :- % Clause B
  rule(B,A,C),
  shiftreduce([C | Stack],Sign, StringIn, StringOut).

shiftreduce(Stack,Sign,[Next | StringIn], StringOut) :- % Clause C shiftreduce([Next | Stack],Sign, StringIn, StringOut).

FIG. 20
PRIOR ART

% shakeandbake(Stack,Output,BagIn,BagOut).

shakeandbake([Sign],Sign,[], []) :- !. % Clause A shakeandbake([A | Stack],Sign,BagIn,BagOut) :- % Clause B
  select(B,Stack,StackResidue),
  unordered_rule(A,B,C),
  shakeandbake([C | StackResidue],Sign, BagIn, BagOut).

shakeandbake(Stack,Sign, [Next | BagIn], BagOut) :- % Clause C
  shakeandbake([Next | Stack],Sign, BagIn, BagOut).

FIG. 21
PRIOR ART

Input: [pp(à)/np(+m) np(+f) np(+m) s\np(+f)/pp(à) ]
   "à"   "Françoise" "Marie" "plaît"
Stack: []

FIG. 22
PRIOR ART

Input: [ np(+m)   s\np(+f)/pp(à) ]
       "Marie"   "plaît"

Stack: [np(+f)   pp(à)/np(+m)]
        "Françoise"   "à"

FIG. 23
PRIOR ART

Input: [s\np(+f)/pp(à)]
        "plaît"

Stack: [np(+m)   np(+f)   pp(à)/np(+m)]
        "Marie"  "Françoise"   "à"

FIG. 24
PRIOR ART

Input: [s\np(+f)/pp(à)]
        "plaît"

Stack: [pp(à)   np(+f) ]
        "à Marie"   "Françoise"

FIG. 25
PRIOR ART

Input: []

Stack: [ s\np(+f)/pp(à)   pp(à)   np(+f) ]
        "plaît"   "à Marie"   "Françoise"

FIG. 26
PRIOR ART

Input: []

Stack: [   s\np(+f)   np(+f)   ]
         "plaît à Marie"   "Françoise"

FIG. 27
PRIOR ART

Input: []
Stack: [ s ]
"Françoise plaît à Marie"
FIG. 28
PRIOR ART
The fierce brown little cat
The brown fierce little cat
The brown little fierce cat
The little brown fierce cat
FIG. 30
PRIOR ART
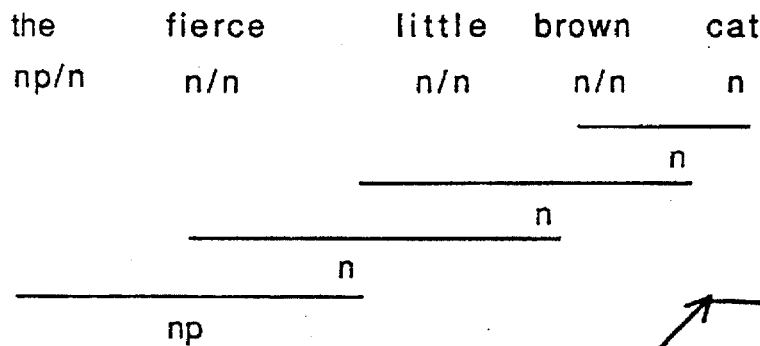
FIG. 29
PRIOR ART
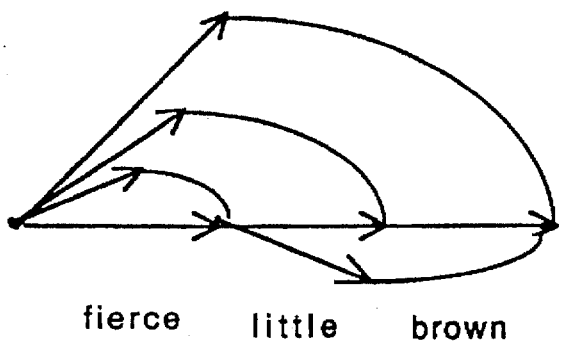
fierce   little   brown
FIG. 31
| Item | Remainder | | Active Part |
|---|---|---|---|
| the | np | / | n(_) |
| fierce | n([]) | / | n([1 \|_]) |
| little | n([1]) | / | n([1,1 \|_]) |
| brown | n([1,1]) | / | n([1,1,1 \|_]) |
| cat | n(_) | | <none> |
FIG. 32

The fierce brown cat

The fierce cat

The brown cat

The little cat

The cat

FIG. 33

$$b[c_1,...c_n] \rightarrow b[c_0...c_n] \; c_0$$

FIG. 34

| 0 | np | : <dummy> | 1 |
| 1 | np | : the | 0 |
| 2 | n(_) | : the | 1 |
| 3 | n([]) | : fierce | 0 |
| 4 | n([1|_]) | : fierce | 1 |
| 5 | n([1]) | : little | 0 |
| 6 | n([1,1|_]) | : little | 1 |
| 7 | n([1,1]) | : brown | 0 |
| 8 | n([1,1,1|_]) | : brown | 1 |
| 9 | n([1,1,1]) | : cat | 0 |

FIG. 35

Constraint Graph

| 0 | np | : <dummy> | <= | 1 |
| 1 | np | : the | => | 0 |
| 2 | n(_) | : the | <= | 3;5;7;9 |
| 3 | n([]) | : fierce | => | 2 |
| 4 | n([1|_]) | : fierce | <= | 5;7;9 |
| 5 | n([1]) | : little | => | 2;4 |
| 6 | n([1,1|_]) | : little | <= | 7;9 |
| 7 | n([1,1]) | : brown | => | 2;4;6 |
| 8 | n([1,1,1|_]) | : brown | <= | 9 |
| 9 | n([1,1,1]) | : cat | => | 2;4;6;8 |

FIG. 36

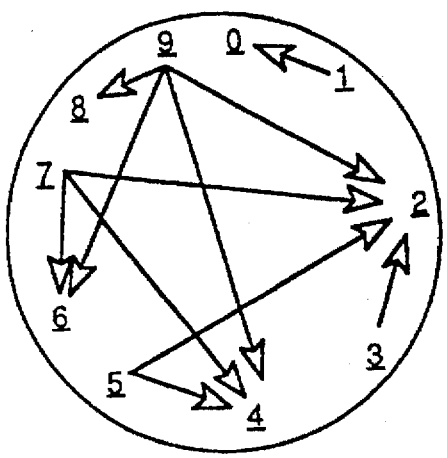
FIG. 37
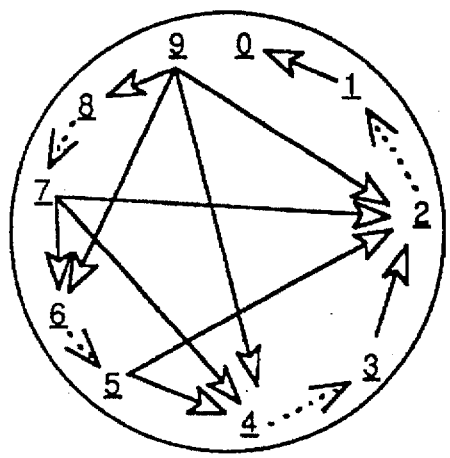
FIG. 38
Constraint Graph
| 0 | <resolved> | | | | |
|---|---|---|---|---|---|
| 1 | <resolved> | | | | |
| 2 | <resolved> | | | | |
| 3 | <resolved> | | | | |
| 4 | n([1 | _]) | : fierce | 1 <= 5;7 |
| 5 | n([1]) | : little | 0 => 4 |
| 6 | n([1,1 | _]) | : little | 1 <= 7 |
| 7 | n([1,1]) | : brown | 0 => 4;6 |
| 8 | <resolved> | | | | |
| 9 | <resolved> | | | | |
Unifications:  8 = 9 = n([1,1,1])
0 = 1 = np
2 = 3 = n([])
FIG. 39
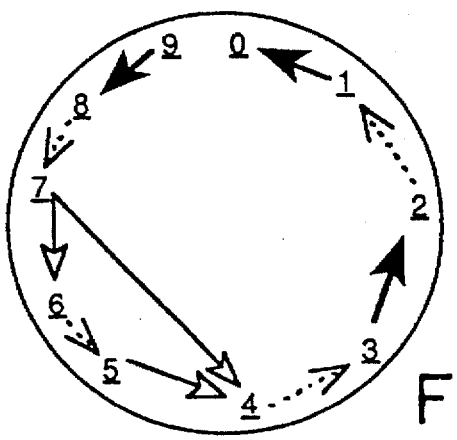
FIG. 40

Constraint Graph

| | |
|---|---|
| 0 | <resolved> |
| 1 | <resolved> |
| 2 | <resolved> |
| 3 | <resolved> |
| 4 | <resolved> |
| 5 | <resolved> |
| 6 | <resolved> |
| 7 | <resolved> |
| 8 | <resolved> |
| 9 | <resolved> |

Unifications:  0 = 1 = np

2 = 3 = n([])

4 = 5 = n([1])

6 = 7 = n([1,1])

8 = 9 = n([1,1,1])

% newshakenbake(BagIn, Result)

newshakenbake(BagIn, Result) :- new_constraint_graph(BagIn, G), newshakenbake([],Result, BagIn, [],G).

% newshakeandbake(Stack,Output,BagIn,BagOut,Graph).

newshakeandbake([Sign],Sign,[], [],_) :- !.

newshakeandbake([A | Stack],Sign,BagIn,BagOut,G) :- select(B,Stack,StackResidue), unordered_rule(A,B,C, Info), update(Info,G), newshakeandbake([C | StackResidue],Sign, BagIn, BagOut,G).

newshakeandbake(Stack,Sign, [Next | BagIn], BagOut,G):-
    newshakeandbake([Next | Stack],Sign, BagIn, BagOut,G).

FIG. 43

Constraint Graph

| 0 | s  | : <dummy>  | <= | 1       |
|---|----|------------|----|---------|
| 1 | s  | : believes | => | 0       |
| 2 | s  | : believes | <= | 7       |
| 3 | np | : believes | <= | 4; 5; 6. |
| 4 | np | : John     | => | 3; 8; 9. |
| 5 | np | : Mary     | => | 3; 8; 9. |
| 6 | np | : Fred     | => | 3; 8; 9. |
| 7 | s  | : loves    | => | 2       |
| 8 | np | : loves    | <= | 4; 5; 6. |
| 9 | np | : loves    | <= | 4; 5; 6. |

FIG. 44

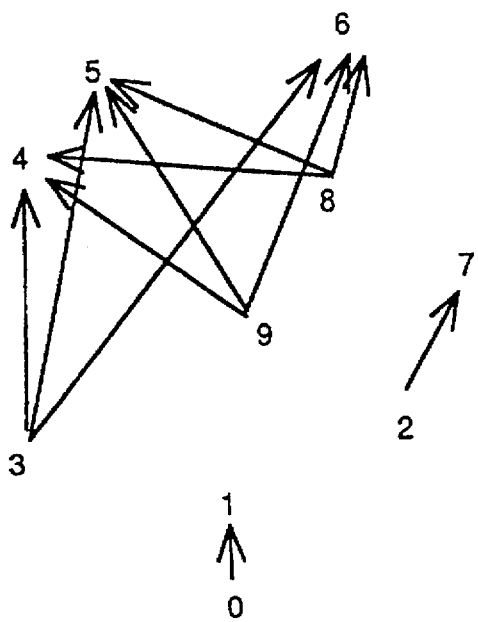
FIG. 45
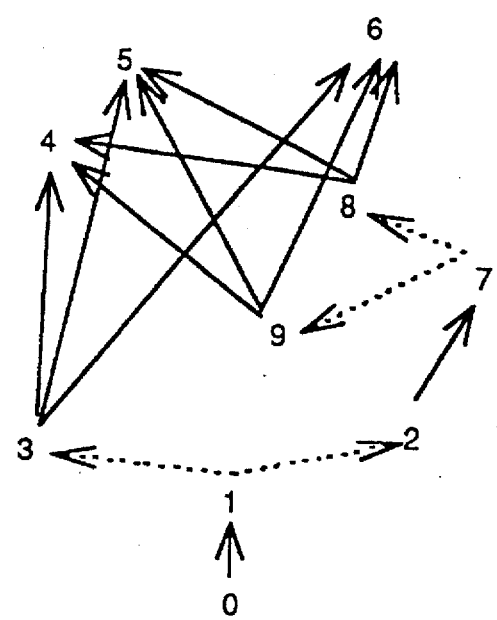
FIG. 46
```
0  =  1  =  s
2  =  7  =  s
3  =  4  =  np
5  =  8  =  np
6  =  9  =  np
```
FIG. 47
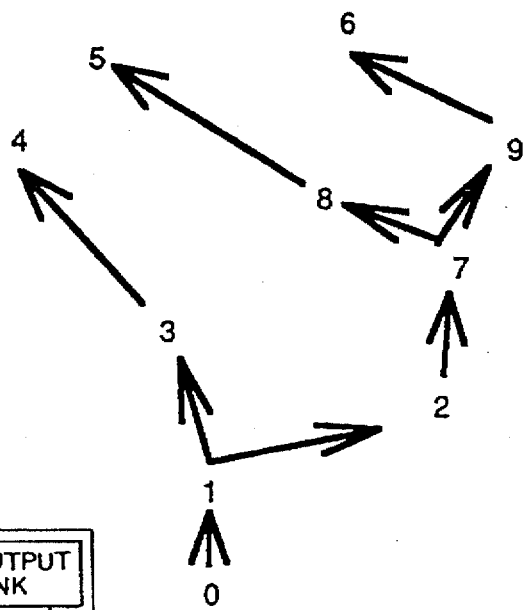
FIG. 48
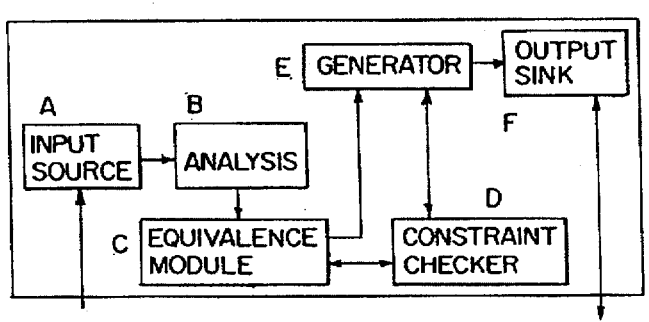
FIG. 49

| Example | Length | Whitelock | New Algorithm |
|---|---|---|---|
| 1 a fox | 2 | 1 | 1 |
| 2 the cat | 2 | 1 | 1 |
| 3 a yellow fox | 3 | 3 | 2 |
| 4 the brown cat | 3 | 3 | 2 |
| 5 a tame yellow fox | 4 | 7 | 3 |
| 6 the fierce brown cat | 4 | 7 | 3 |
| 7 a big tame yellow fox | 5 | 15 | 4 |
| 8 a fierce little brown cat | 5 | 15 | 4 |
| 9 the cat likes a fox | 5 | 6 | 6 |
| 10 the fierce cat likes a fox | 6 | 13 | 9 |
| 11 the fierce cat likes a tame fox | 7 | 27 | 19 |
| 12 the little brown cat likes a yellow fox | 8 | 55 | 16 |
| 13 the fierce little brown cat likes a yellow fox | 9 | 111 | 20 |
| 14 the fierce little brown cat likes a tame yellow fox | 10 | 223 | 25 |
| 15 the fierce little brown cat likes a big tame yellow fox | 11 | 447 | 30 |
| 16 the little brown cat likes a big yellow fox | 9 | 111 | 20 |

FIG. 50

MACHINE TRANSLATION SYSTEM UTILIZING BILINGUAL EQUIVALENCE STATEMENTS

2. FIELD OF INVENTION

The present invention relates to a machine translation system for processing a text of a first language (which will hereinafter be referred to as the source language) to produce translated texts in one or more other languages (which will hereinafter be referred to as the target languages). In particular, the invention relates to a machine translation system which embodies the highly flexible Shake-and-Bake methodology (to be described later herein), but which is more efficient than previous exploitations of this methodology, allowing the system to process longer and more complex texts than has previously been possible with this approach.

3. RELATED BACKGROUND ART

Machine translation systems operate by reading a text from an input source (such as a keyboard, telephone line, optical character reader or computer data file), then entering that text into a translation module, which processes the text by drawing on information from grammars, dictionaries and other knowledge sources provided in the system (this information will be called grammatical and lexical information, in accordance with the prevailing terminology ) to deduce information about the usage and meaning of the words of the source language text as they occur in context.

The information which has been collected and stored in a buffer of the translation module is then used to construct either a single target language text or a plurality of target language texts, such that these texts are possible translations of the source language text.

The translated texts are then made available to the user by conveying them to an accessible location, such as a screen, a printer or a second computer file. The major differences between machine translation systems arise from the different ways in which information about input and output texts are obtained, and in the ways in which the information, once obtained, is maintained and manipulated by the system.

The present invention provides a system which embodies a particularly flexible method for manipulating grammatical and lexical information, and which also embodies a technique for storing and using this information with greater efficiency than has previously been possible.

In order to clearly establish the relevant prior art, the first part of this section describes what might be called the standard organization of a machine translation system, based on the transfer approach. Then the second section describes the Shake-and-Bake method, both to demonstrate its advantages over the transfer approach and to introduce the problems which the present invention solves.

3.1 Machine Translation based on structural transfer

The transfer-based approach to machine translation involves the construction of data structures which are referred to as phrase markers. FIG. 1 contains a schematic representation of one such structure for the sentence "time flies like an arrow" and FIG. 2 contains an alternative structure for the same sentence. The diagram in FIG. 1 corresponds to the reading of the sentence in which "time" is interpreted as a noun, "flies" is a verb, "like" is a preposition, "an" is an article and "arrow" is a noun, while FIG. 2 shows the alternative reading which "time flies" is a phrase picking out a particular sort of fly, "like" is a verb, and "an arrow" is a noun phrase. The second reading can therefore be roughly paraphrased as "Some insects like a feathered archaic weapon". The two readings will therefore require different translations into the target language or languages. The information which is needed to discriminate between the different readings is encoded in the different phrase markers which they receive after linguistic analysis.

Technically, a phrase marker is a general tree consisting of nodes and arcs. The nodes are the symbols which indicate the linguistic categories assigned to the various sub-strings of the input text, and the arcs are the lines which join the nodes. Arcs are understood to be directed, starting at the top of the page and progressing downwards. In order for a structure like this to be a tree, it is necessary that two conditions are met. Firstly, there must be a single distinguished node from which all others directly or indirectly descend (this is conventionally referred to as the root node). Secondly, two arcs must not join at their lower ends, although they may be joined at their upper ends, as in the diagram. These conditions are sufficient to pick out tree structures from a larger class of mathematical structures which include forests, directed graphs and general graphs.

Machine translation systems which rely on phrase markers operate by splitting source language texts up into translation units of one or more sentences or sub-parts of sentences, and assigning a phrase marker to each translation unit. They then process the source language phrase markers in order to produce corresponding target language phrase markers. This process is referred to as transfer. Just as the original derivation of phrase markers depended on the use of information about the source language, transfer requires that the system make use of internally stored information about the possible equivalences which may obtain between the structures of source and target languages.

Unfortunately this approach of transforming one tree structure to another tree structure, which is usually referred to as structural transfer, while reasonably satisfactory when a text and its translation exhibit very similar structures, has serious disadvantages when source and target sentences display major structural differences. For example, FIGS. 3A and 3B show the correspondence between the English sentence "Mary loves Frances" and the French translation, which is "Marie aime Francoise". Since the structures are so close, translation reduces to the replacement of English words with their French equivalents. It is straightforward to design a set of rules which will carry out this process in a machine translation system.

FIGS. 4A and 4B show a more complex translation, that between "Mary likes Frances" and "Francoise plait a Marie," in which the structures are not the same. This type of translation phenomenon is called argument switching, since equivalent arguments, in this case Mary/Marie and Frances/Francois, appear in reversed positions in the English and French text. In such situations it becomes more difficult to formulate correct procedures for carrying out the transfer operation, though this is not yet a major problem. The problem arises because of the differing syntactic and semantic rules which govern the use of "plaire" in French and the use of "to like" in English. This problem is usually resolved by implementing a level of semantic representation which has the role of producing an expression representing the meaning of the sentences in question. The operations which build the phrase marker for the English sentence are associated with semantic operations which simultaneously construct a semantic representation for the sentence. In this case it is reasonably straightforward to implement a system of syntactic and semantic rules which has the effect of generating the structure shown in FIGS. 4A and 4B, while simultaneously producing like (mary, frances) as its semantic representation. This representation says that there is a relationship between like, mary and frances. We call the element occurring outside the brackets the predicate of the relationship, and the two elements inside the brackets are the first and second arguments of the relationship. It is conventional to provide semantic representations in which the participant which appears in subject position of sentences also appears in the first position of the semantic representation. In English it is usually the case that the verb corresponds to the predicate, the subject to the first argument, and the object to the second argument. The same rules are convenient for French and the usual semantic representation for the French sentence "Francoise plaît à Marie" is plaire (francoise, marie) reversing the order which we found in like (mary, frances). If one allows transfer rules to refer to semantic representations, as has been done in many previous machine translation systems, it is possible to ensure that the appropriate French semantic representation is produced. This is referred to as argument switching, the order of the arguments of the expression which means "likes" has been reversed. Once we have the semantic representation for the French we can use this to control the process by which French words are selected and assembled into a French sentence.

Many machine translation systems are able to generate sentences like the French sentence shown in FIG. 4B. In the next section a detailed demonstration of how Shake-and-Bake does this will be given.

The problems which were alluded to above become still more acute in the case of sentence pairs like the English-German combination of "Mary likes swimming" and "Marie schwimmt gern", where there is still less obvious connection between the lexical items and corresponding structures of the source and target sentences. The problematic situation is shown in FIG. 5. It is very difficult to state a set of rules to carry out this transfer correctly without compromising the correctness of the transfer for other sentences.

Even the availability of a semantic representation does not help much here, because the main verb of the English sentence is "likes" and the main verb of the German sentence is "schwimmen", so argument switching will not suffice to implement the transfer. This is because the semantic representation for English will be something like likes (mary, swimming) which has little connection with the German representation, which might be something like schwimmt (marie, gern). This problem, which has been much discussed in the machine translation literature, represents a real difficulty for any machine translation system based on the rewriting of phrase markers, and resists ad hoc solutions, since closely related difficulties arise in the translation of sentences like "Mary likes swimming in races" which translates most naturally as "Marie schwimmt gern wett", where "wett" is a part of German verb "wettschwimmen", which can be glossed as meaning "to swim competitively".

Some of the difficulties then in translating such sentences are due to an adoption of an approach in which the whole of a translation unit is reduced to single hierarchically structured phrase marker, as is the case in standard transfer systems.

It is noted that some of the difficulties in translating such sentences are due to the adoption of an approach in which the whole of a translation unit is reduced to a single hierarchically structured phrase marker, as is the case in standard transfer systems.

The approach which is described in the next section avoids these difficulties by adopting an alternative design in which transfer rules are no longer defined between phrase markers. The invention is directed towards improving the efficiency of the generation stage of the machine translation process, in other words that part of the process which produces the target language sentence from the results which have been obtained after the source language sentence has been analysed and all necessary information about the meaning and structure of the sentence has been deduced. The next section nevertheless describes the whole process of Shake-and-Bake translation, explaining its differences from the approaches described earlier.

3.2. Shake and Bake Translation

3.2.1. Introduction

The Shake-and-Bake approach to machine translation begins from the radical premise that it may not be appropriate to define translation equivalences on the basis of phrase markers. We take a lexicalist approach, under which information is closely associated with the smallest individual meaning bearing units of the texts (technically, these meaning bearing units are called morphemes). This approach is widely established in the Natural Language Processing community, and is not in itself new. We begin by considering the analysis of a sentence, describe a mechanism of non-structural transfer, and finish by describing the process of generation.

The Shake-and-Bake approach to machine translation assumes that it is not appropriate to define translation equivalences on the basis of phrase markers. In order to describe this approach it is helpful to introduce some basic concepts.

Each word in a language is associated with several types of information. In FIG. 6 such information is exemplified for three English words. The information associated with a word, or indeed with any phrase, is called a sign. In particular, a sign comprises syntactic information—it category, and semantic information—its index and restrictions.

The possible categories are defined recursively as follows:

There is a set of basic categories e.g. s, np, etc. A category is either a basic category, or is of the form X/Y or X\Y where X and Y are categories.

Signs may be combined when the categories they contain correspond to one of the patterns given in FIG. 7. For instance, the first of these rules says that a category X/Y and a following category Y may be combined to give a category X. These rules of combination can be seen as analogous in effect to the operation of arithmetic cancellation.

The character and purpose of the semantic representation are best illustrated by an example, which will be given in the next section.

3.2.2. Analysis

Our example will describe the automatic translation of the sentence "Mary likes Frances" into French. We shall assume that the system has preselected the appropriate verbal sense of "likes", although in practice a machine translation system would also attempt to build an analysis on the premise that "likes" might be a noun, failing only because it is not possible to combine this premise using the grammar rules available.

We start by showing the information about the words "Mary", "likes" and "Frances" which would be contained in the grammar for English, and explaining the rules by which this information is combined by the system. A simplified version of the information in question is shown in FIG. 6.

An English gloss on the information about this particular usage of "likes" is the following

- the category of "likes" is something which needs to combine with a noun phrase to its right followed by another noun phrase to its left, which will then yield a sentence. Categories correspond to the symbols which label the nodes of the phrase markers introduced earlier.
- The index of "likes" is #3. Indices can be thought of as names for entities (usually individuals and events). Entities having the same index are the same entity, but the converse is not necessarily true (It will turn out in the course of analysis that the entities described by #1 and #4 in the table are the same, but at this stage we must still consider the possibility that they are different, and so they must be assigned different indices).
- There are restrictions on the interpretation of "likes". In particular, #3 must be an event which is a "liking", the index of the np labelled as $np_1$ must be #4, the index of the np labelled as $np_2$ must be #5, the experiencer of #3 must be #4 and the theme of #3 must be #5. The nps which are identified in the course of analysis as matching these restrictions will be identified as the subject (or experiencer) and object (or theme) of the verb.

Of course, we have picked out a particular sense of the word "likes", ignoring the possibility that it is a plural noun, as in "his likes and dislikes".

In order to use the information contained in FIG. 6, we also need a mechanism by which such pieces of information can be combined. This is provided in FIG. 7, which defines two suitable rules. The first, called leftward application is for the case that a category with a backward slash finds its argument to its left, and the other, called rightward application is for the corresponding case where an item with a forward slash finds an argument to its right. In either case a and b stand for arbitrary categories (with or without slashes). We use Steedman's notation for categorial grammars, in which a\b stands for an a needing to combine with a b to its left. Thus, left and right application are simply rules which combine specific categories to the left or right of a given category to produce a certain result (which is why such rewrite rules are sometimes referred to as 'production rules'). The direction of the slash (leftward or rightward) indicates the direction in which the rule looks to make a possible combination to produce a certain result).

By successive applications of these rewrite rules we can combine the categories describing the individual lexical entries for "Mary likes Frances" to form a single sentence (whose category is indicated by s) which is correctly structured according to the rules of the grammar. We record the steps involved in this reduction in the form of a tree structure for "Mary likes Frances", which is shown in FIG. 8. This is closely related to the structure in FIG. 4, but the main interest of the approach lies in the way the semantic representation is constructed. When objects are combined according to the rules in FIG. 7, it has the effect of identifying indices between different descriptions, which helps to build up a representation of the meaning of the sentence. Because the outer np of s\np/np has combined with the np from the word "Frances", the system combines the restrictions associated with the two categories in question, deducing that #2 and #5 refer to the same individual.

This operation of identifying categories and combining restrictions is fundamental to the operation of most modern computational grammars. Because of an analogy with an operation which occurs in symbolic logic, this operation is usually called unification. The grammars in question inherit the name, and are referred to as unification grammars. In the same way that the information of the outer np of s\np/np is combined with the information from the entry for "Frances" giving "likes Frances", the information from the entry for "Mary" is combined with that from the inner np of s\np/np, ensuring that #1 and #4 are matched, giving "Mary likes Frances". Once objects have been matched by unification they are indistinguishable. The information in FIG. 6 is consolidated and updated by the system to yield the more specific descriptions in FIG. 9. Each of the three rows in FIG. 9 represents a sign, and the three signs together make up the bag. In the row containing information about the word "likes" we have built up a description of an event which is described by the sentence in question.

In the cell containing information about the word "likes" we have built up a rather detailed description of an event which is described by the sentence in question. This is very similar to the semantic representation likes (mary, frances) which was developed using the phrase marker approach, but under the Shake-and-Bake technique the information is associated with a single word, whereas with phrase markers the information is associated with the tree as a whole. It is precisely this difference which gives the Shake-and-Bake approach its flexibility.

3.2.3. Non-structural transfer

For Shake-and-Bake machine translation the transfer process differs from that involved in structural transfer in that the main input to the process is not a tree structure but an unordered collection of structured information (technically referred to as a 'bag' BG), as contained in FIG. 9. Although the process of analysis did involve the construction (in FIG. 8) of a tree structure similar to that of FIG. 2, this was no longer done for its own sake, but rather because it facilitated the transfer of useful information between the descriptions of the different words.

The Shake-and-Bake system uses equivalence rules, also referred to as bilingual equivalence statements, to implement a non-structural version of the transfer process. Sample equivalence rules are given in FIGS. 10 and 11. The equivalence rules do not need to make reference to structural differences in the way the signs are used.

Note that the French half of FIG. 10 contains two signs ("plaire" and "à") which are placed in correspondence with a single sign ("likes") in English, and that (crucially) indices are equated between the two halves of the equivalence. This ensures that the plaire event in the French half is the same event as the liking event in the English half.

The equivalences in FIG. 11 simply describe the convention that the French for "Mary" is "Marie", that the French for "Frances" is "Francoise" and that the French and English names refer to the same individuals.

These equivalences are used in translating the sentence "Mary likes 0 Frances". Recall that the process of analysis has given rise to the collection of signs SG1–SG3 in FIG. 9. We match this collection of signs against the equivalence rules by unification, requiring that each sign in the source language analysis is matched against exactly one sign in the source language half of the equivalence rules. In the concrete example this means that the information available from source language analysis is shown in FIG. 9, and from bilingual lexical lookup shown in FIGS. 10 and 11, are combined to yield the result in the target language (which is the output of the Shake-and-Bake generation algorithm) shown in FIG. 12. In the example the information available from source language analysis as shown in FIG. 9 is matched against the equivalences shown in FIGS. 10 and 11. FIG. 12 shows the equivalences with shared indices between the different signs in the two languages.

3.2.4. Generation

We can now read off from the French half of the equivalence a collection of four signs which it is possible to assemble into the French sentence "Françoise plaît à Marie". The tree diagram of this sentence is shown in FIG. 13.

We have now explained the background which is necessary in order to understand the task of the present invention, which is to improve on the efficiency of the process by which the unordered collection of signs which results from the process of analysis and equivalence finding can be assembled into an ordered collection of signs which constitute a complete sentence. The prior art in this field is an algorithm developed by Whitelock and others at Edinburgh University and Sharp Laboratories of Europe. The main merits of this algorithm are clarity and correctness, but it frequently proves more computationally costly than is acceptable in a commercially viable system.

3.2.5. Shake-and-Bake Generation

3.2.5.1. Specification of Shake-and-Bake Generation

The process of assembling a target language structure from the target side of the lexical equivalences is known as Shake-and-Bake generation. The translated text is a by-product of this process. It is extremely easy to specify Shake-and-Bake generation correctly and decidably, as will be shown. However, this specification is intrinsically inefficient. This examination of the background art will thus conclude with an illustration of the problems of efficiency that arise.

Shake-and-Bake generation has more in common with a parsing algorithm (the algorithm which constructs an analysis from and ordered collection of words) than with conventional generation from logical form, since the latter process begins from a single structure, while the input to the Shake-and-Bake generation task consists of the following elements A bag (B) of signs, There are |B| signs in B. A grammar (G) against which to parse this input string. This grammar is a general statement of the rules which a text has to obey in order to be accepted as a legal sentence of the language in question. and a solution to the problem consists of a parse of any sequence (S) such that S contains all the elements of B.

There is only one difference between Shake-and-Bake generation and the standard parsing problem, in which a known sequence of words has to be combined to produce analyses. This difference, which is crucial, is that B (the bag of signs) is unordered. In other words, the major difference is that Shake-and-Bake has an unordered input (a bag of lexical entries) and must find some permutation of that input which leads to correct output. All items from the input bag must be used, but in any order. The target language word order arises as a result of building a correct target language structure. In the generation problem we need to find an appropriate sequence of words, making the problem harder.

We shall begin by presenting Whitelock's algorithm. As background we shall first display a standard parsing algorithm, then generalise it to produce Whitelock's generation algorithm. After this we shall introduce further background information necessary in order to appreciate the invention. The next section show how minimal changes are needed to derive a Shake-and Bake algorithm from a simple parsing algorithm. This will give a clear understanding of where the efficiency problems arise, and hence provide the immediate context for the invention.

3.2.5.2. Shift-reduce parsing

Shift reduce parsing is a technique which is widely used for automatic parsing of ordered sentence. It uses a data structure called the stack, which serves as an intermediate storage location for partially constructed analyses. We shall again use the example of the English sentence "Mary likes Frances" to show how the algorithm works.

The process begins by looking up the words in the dictionary provided by the system, and storing this information in a buffer. At this stage the stack is empty, and we have the configuration shown in FIG. 14.

There are two operations which can be applied to configurations, a shift operation and a reduce operation. The shift operation takes the first element of the input and places it on the stack. This is always applicable until the input becomes empty. The reduce operation becomes applicable when two elements on the top of the stack can be combined by a rule of the grammar (recall the two rules of backward and forward combination). In the current example only the shift action is applicable: the configuration in FIG. 14 is transformed, by means of the shift operation, to the configuration in FIG. 15

We are unable to carry out a reduce operation, so a second shift produces the configuration in FIG. 16.

We are still unable to carry out a reduction (since the s\np/np is looking for an np on its right to combine with first, and the np in the stack already is on its left; it is important to note here that s\np/np is actually an abbreviation for a more complicated notation (s\np)/np, where the slash operators have precedence over the bracketing), so we shift the final element of the input on to the stack, producing the configuration in FIG. 17.

It is now possible to apply a rule which combines np and s\np/np, This action yields s\np, placing it on top of the stack, yielding the configuration shown in FIG. 18

This configuration then allows a second reduce action, combining s\np with an np from its left to produce the final configuration in FIG. 19. We also have an option to shift, which we shall ignore for the moment.

When a configuration has been reached which contains nothing except a single element on top of the stack, the parsing process is complete. Prolog will be used as the algorithm specification language. An introduction to Prolog may be found in e.g. William F. Clocksin and Christopher S. Mellish "Programming in Prolog", 3rd Edition, Springer Verlag, 1987. A Prolog program for shift-parsing is shown in FIG. 20.

In principle it is possible for both shift and reduce actions to be available starting from the same configuration. The Prolog language has a built in mechanism for dealing with processes like this, in which various options are explored. This mechanism keeps a record of which options have not yet been explored. After having explored one set of options it will systematically return to points at which unexplored options are available, eventually exploring all possibilities. A Prolog program for shift reduce parsing is shown in FIG. 20.

The three clauses of the program in FIG. 20 say the following things (Clause A) if the stack has one element, which is Sign, and Stringin is empty, then the answer is Sign and StringOut is also empty.

(Clause B) if the top of the stack consists of two elements (A) and (B), such that A and B can be reduced (with B on the left), then the answer will be Sign and the output string StringOut, provided only that it is possible to parse the configuration resulting from popping A and B (i.e. removing) from the top of the stack, then pushing C onto it (i.e. adding C to it). A and B can be reduced if they are combinable by one of the rules given in FIG. 7, which can be rendered in Prolog in the form:

rule (a/b, b, a).

(b, a\b, a).

(Clause C) StringOut and Sign can be produced if an answer can be produced by shifting the first element of the input string then parsing the resulting configuration.

The Prolog interpreter handles the book-keeping associated with the choice between clause A and clause B, and ensures that all possibilities are explored. If several different combinations of choices yield answers, there will be multiple parses for the sentence in question, which may, but need not, correspond to different interpretation of the sentence and/or a different set of suitable translations. Shift-reduce parsing is a well-established procedure in the computational and linguistic literature (see e.g. Aho, A. H. and J. D. Ullman "The Theory of Parsing, Translation and Compiling" Englewood Cliffs, N.J.: Prentice Hall, 1972.

The main difference is that the signs which are submitted for combination are not just the top the top two signs on the stacks, but the top sign and any one other (and hence the data structure is strickly no longer a stack).

3.2.5.3. Whitelock's algorithm

Whitelock's algorithm is a generalisation of Shift-Reduce parsing. The main difference is that the stack is replaced by a bag (where a bag is an unordered data structure which behaves like a set, except that it may contain duplicate elements). Instead of taking the element to be reduced from the top of the stack, the new algorithm involves a reduce step in which the current element of the input string may be matched against any element of the stack. A corollary of this is that the call to rule/3 in shiftreduce (e.g., rule (B, AC) in FIG. 20) is replaced by a call to unordered_rule/3 in shakeandbake (e.g., unordered_rule (A, B, C) in FIG. 21 ), ensuring that the algorithm ignores the order of the input bag. The Prolog algorithm becomes that shown in FIG. 21.

The clauses of FIG. 21 correspond to the following principles of generation.

(Clause A) if the stack has one element, which is Sign, and BagIn is empty, then the answer is Sign and BagOut is also empty (Clause B) if the stack has A as its top element, B is to be found elsewhere in the stack, and A,B can be reduced by an unordered rule, then the answer will be Sign, provided that the stack formed by adding C to the residue after A and B have been removed will itself yield an answer.

unordered_rule/3 is the same as rule/3 but the items can appear in either order unordered_rule (X/Y, Y, X). unordered_rule (Y, X\X, X). unordered_rule (Y, X/Y, X). unordered_rule (X\Y, Y, X).

(Clause C) BagOut and Sign can be produced if an answer can be produced by shifting the first element of the input bag then parsing the resulting configuration.

As before, there are situations in which it may be necessary to explore choices clauses B and C of the program, but there is the further possibility that it may be possible to find several different ways of selecting a reducible item from the stack in clause 2, so there are yet further possibilities which must all be investigated by the Prolog interpreter.

By way of example, consider the generation of the sentence "Françoise plaît à Marie" from the set of signs provided by the equivalence rules given in FIGS. 10–12.

We start with the configuration in FIG. 22 (neglecting much of the detail of the signs in question for the sake of brevity).

Here we have summarised the crucial differences between the np which refers to Marie and the np which refers to Françoise by adding the ad-hoc diacritic marks +m and +f to the symbols in question. The first two steps of the process shift two items onto the stack, resulting in the configuration shown in FIG. 23.

It is still impossible to reduce this, because np(+m) is inconsistent with np(+f), so a further shift is necessary, resulting in FIG. 24.

We can now reach into the stack, reducing "Marie" with "à" to yield "àMarie" (here we see the need for the unordered nature of reduction rules). The system produces the configuration shown in FIG. 25

Thence we proceed to FIG. 26, in which the final item has been shifted from the input to the stack.

Here a second reduction is possible, yielding "plaît à Marie" as shown in FIG. 27, and the final reduction combines "Françoise" with "plaît à Marie" to yield the desired outcome, which is shown in FIG. 28. In this particular case only one solution is possible: carrying out shift options in preference to available reductions leads to impasse just as happened in the Shift-Reduce case.

3.2.5.4. Efficiency

There are situations in which Whitelock's algorithm is extremely inefficient. This is because the algorithm explores the choice between shift and reduce actions without investigating the consequences of choosing a particular way. The situations in which this has a dramatic impact on the cost of generation are sufficiently prevalent in natural language to motivate the search for algorithms which make more intelligent use of information about the whole contents of the input bag.

A case in point is found in the analysis of English adjectives. We shall be using the phrase "The fierce little brown cat" as our main example. An analysis of this example using the standard category assignments is shown in FIG. 29.

The categories given in brackets are those of a standard categorial grammar. Given these categories the analysis of the example is that shown in FIG. 29 (Here we are using a style of presentation similar to a tree diagram, but this time with the leaves at the top of the tree, as is familiar to logicians. For historical reasons this is usual with categorial grammars).

For the sake of argument suppose that we need to rule out the questionable versions of the phrase in FIG. 30. It is not clear that these phrases are completely ungrammatical, but they serve the present purpose of providing an illustration, and most English speakers agree that they would only be produced in highly unusual circumstances.

As it stands the grammar is insufficient to rule out these problematic versions, since it does not encode the distinctions between the various adjectives with respect to their ordering. A solution to this problem is to annotate the lexical entries for the adjectives in such a way that the illegal orders are outlawed. We use features to implement a finite-state description of the order requirements of the adjectives in question. The appropriate finite state description is the one given in FIG. 31.

This states that "fierce" must precede "little" or "brown" if either of these are present, that "little" must precede "brown" if both are present. It is possible to encode the relevant precedence information using Prolog style open-ended lists. The idea is that the active part of a sign (i.e that part still trying to combine with something) is an open ended list and the remainder part is a closed list containing strictly fewer elements than the minimum number required to match the closed list. This ensures that modifiers can not be iterated, and a fortiori that the incorrect orders are ruled out. Under this encoding, the fragment given earlier becomes that of FIG. 32.

This set of type assignments prevents the dubious phrases listed above, but still allows syntactically acceptable phrases such as "The fierce cat", "The little cat" and "The little brown cat". In principle, this means that generation from the bag produced by analysis of "La petite chatte féroce et brune" will eventually yield the correct outcome. Unfortunately, for phrases like this one Whitelock's algorithm displays spectacular inefficiency. For example, the algorithm will construct the intermediate phrases shown in FIG. 33, all of which eventually lead to an impasse because it is impossible to incorporate the remaining adjectives while respecting the prescribed ordering.

The reason for this behaviour is that Whitelock's algorithm makes reductions on the basis of mere possibility, rather than taking account of the fact that all elements of the input bag must eventually be consumed. The algorithm embodied in the current invention avoids this difficulty by exploiting global properties of the entire bag in order to ensure that fewer blind alleys are explored.

SUMMARY OF THE INVENTION

The invention is an augmentation of the Shake-and-Bake generator with a mechanism for constraint propagation. This mechanism (also referred to herein as a constraint checking module or a constraint solving component) maintains a data structure representing possible alternative combinations of basic categories. This is called the constraint graph. Each time the generator (also referred to herein as a tree building module or a structure building component) combines two signs, it passes the information about the categories that are combined within the signs to the constraint mechanism. The graph is updated with the information that certain possible combinations have actually taken place. The mechanism then propagates the information through the constraint graph that the combining categories are not permitted to take part in further combinations. If, during propagation, any category is left with no possible combining categories, then propagation fails. Failure is communicated to the Shake-and-Bake generator, and the sign combination which led to it is rejected. The invention thus eliminates parts of the search space that cannot lead to a solution. It then becomes feasible to generate longer and more complex sentences than with the unelaborated Shake-and-Bake algorithm. It will be seen that constraint propagation reduces the number of combinations actually tried, and that the magnitude of the reduction increases with increasing problem size.

3.3. Constraint propagation

We are looking for a global property of the input bag which can be exploited to prune the search space involved in the generation process. Van Benthem's [1986] observation that categorial grammars display a count invariant, while promising, cannot be directly applied to unification based grammars. As an alternative we develop an approach to Shake-and-Bake generation in which the basic generator is augmented with a simple constraint propagation algorithm. The augmented generator is potentially more efficient than Whitelock's, since the constraint propagation components helps to direct the generator's search for solutions.

Thus, according to the present invention there is provided a machine translation system which operates by reading source language text including source language words from an input source, then entering that text into an analysis module which processes the text by drawing on information from source language grammars, dictionaries and other knowledge sources provided in the system to deduce source word information about the usage and meaning of the source language words of the source language text as they occur in context, then matching the source language words against the source language sides of a set of bilingual equivalence statements provided within a bilingual dictionary of the system and collecting target language words obtained as a result of such matching, using a generation module to combine target word information from the collected target language words to construct one or more candidate target language texts corresponding to the source language text, characterised in that the generation module is split into two separate functional components, the first of which is dedicated to the processing of information which does not depend on the eventual order of words in the target language text or on the details of associations between the component parts of the target language words, and the second of which is dedicated to the construction of structures which do respect constraints of word order and associates between the words of the target language text, and in that the second component communicates with the first component in order to synchronise analyses.

A particular implementation of the invention will hereinafter be described by way of example with reference to FIGS. 35 to 50 of the accompanying drawings.

BRIEF DESCRIPTION OF THE DRAWINGS

In the drawings:

FIG. 9 is a table in which the information about the words in FIG. 6 has been consolidated to represent interrelationships between the words;

FIGS. 10 and 11 show entries from bilingual lexical look-up;

FIG. 12 is a table showing the result of target language generation;

FIG. 20 is a program in Prolog for the known shift-reducing parsing;

FIG. 21 is a program in Prolog showing a modified shift-reduce parsing technique according to Whitelock;

FIGS. 22 to 28 show successive steps in the application of the shift-reduce parsing program of FIG. 21;

FIG. 29 shows an inverted tree structure of a particular noun phrase;

FIG. 30 shows undesirable versions of the noun phrase of FIG. 29;

FIG. 31 is a finite state description of the order requirements of the adjectives in the noun phrase of FIGS. 29 and 30;

FIG. 32 shows the division of complex signs for the words in the phrase;

FIG. 33 is a list of intermediate, incomplete phrases likely to be constructed by operation of the Whitelock algorithm;

FIG. 34 is a statement of a phrase structure rule for the combination of categories;

FIG. 35 is a list of word signs in a sample phrase together with associated nesting levels;

FIG. 36 is a constraint graph showing a list of word signs with possibilities for combinations thereof;

FIGS. 37, 38, 40 and 42 are graphical representations of intermediate states in the computational process performed by the system according to the invention;

FIGS. 39 and 41 are constraint graphs, again illustrating intermediate states in the computational process;

FIG. 43 illustrates a program in Prolog corresponding to a modification of the Whitelock Parser;

FIG. 44 is a constraint graph comprising a list of word signs with possibilities for combinations for a particular sentence;

FIGS. 45 and 46 are graphical representations of intermediate states in the computational process as applied to the sentence listed in FIG. 44;

FIG. 47 illustrates the unifications achieved by the computational process illustrated in FIGS. 44 to 46;

FIG. 48 is a spanning tree of FIG. 46;

FIG. 49 is a schematic representation of a machine translation system in accordance with the invention; and FIG. 50 is a table illustrating, for a number of expressions/phrases of increasing length the number of reductions which need to be carried out respectively in systems operating using the Whitelock algorithm and the algorithm disclosed later herein in accordance with the invention.

DETAILED DESCRIPTION OF THE PREFERRED EMBODIMENT

Figure 1:
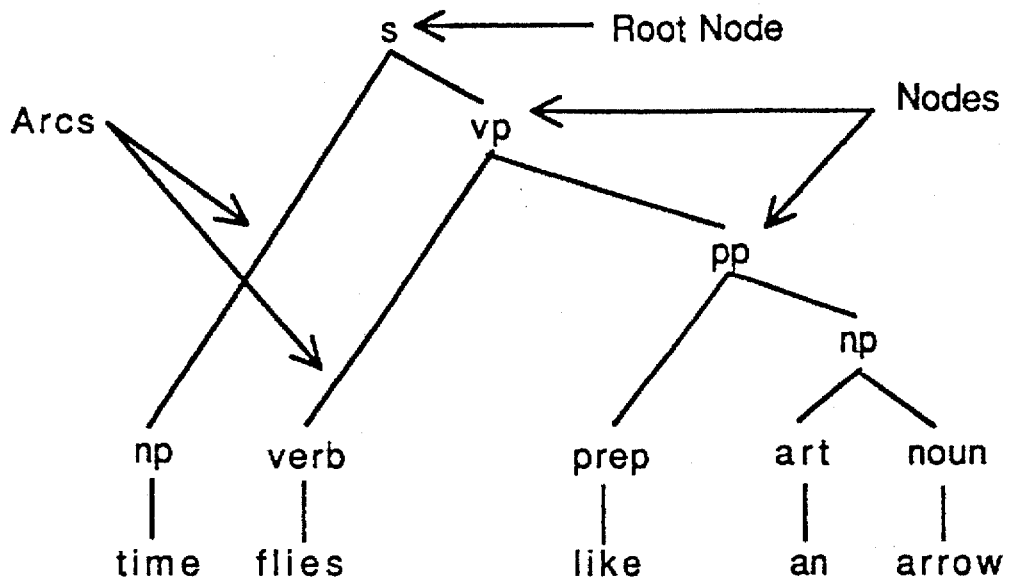
FIG. 1 shows a phrase marker representing one structure for a particular sentence.
Figure 2:
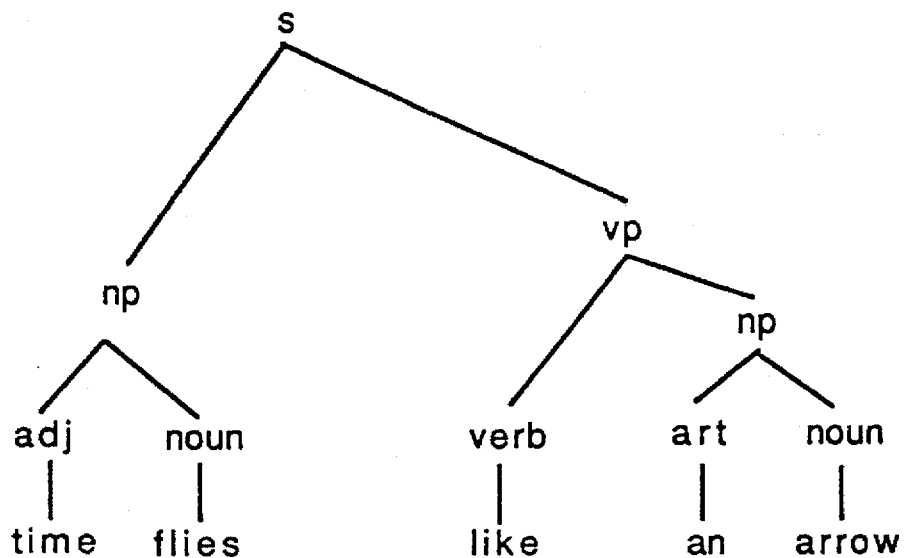
FIG. 2 shows a phrase marker representing another structure for this particular sentence.
Figure 3A:
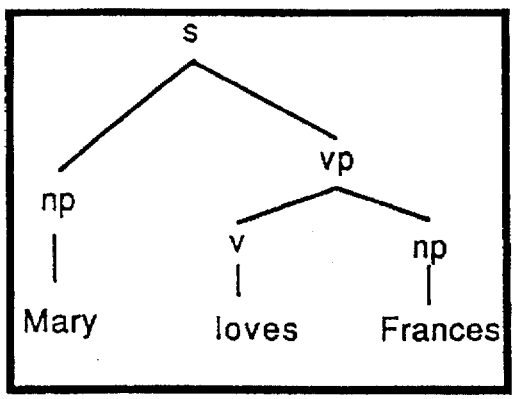
FIGS. 3A and 3B show correspondence between the phrase markers for an English sentence and its French translation.
Figure 3B:
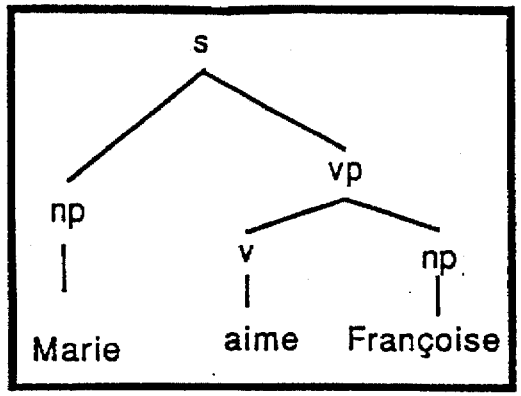
Figure 4A:
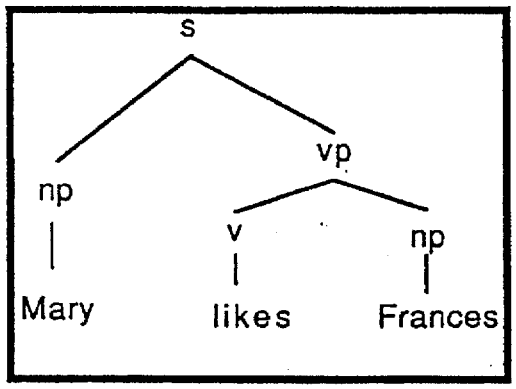
FIGS. 4A and 4B show the correspondence between phrase markers for another English sentence and its French translation.
Figure 4B:
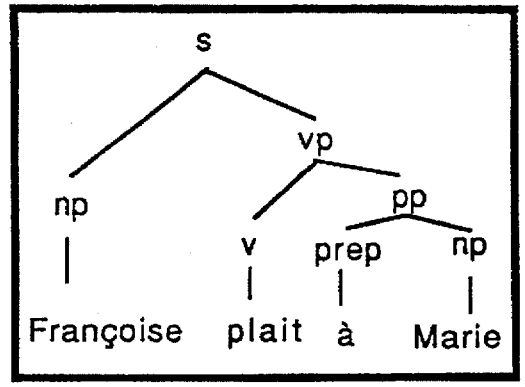
Figure 5A:
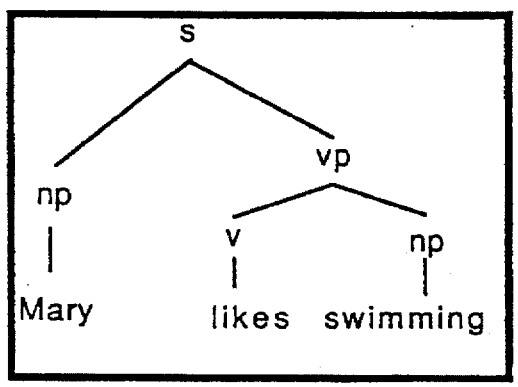
FIGS. 5A and 5B show the correspondence between phrase markers for another English sentence and its German translation.
Figure 5B:
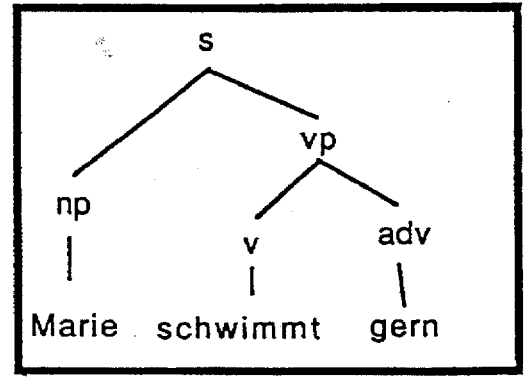
Figures 6, 7, 8:
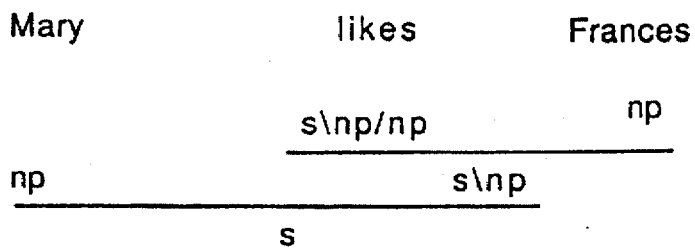
FIG. 6 is a table showing information about certain words as contained in English grammar.
FIG. 7 illustrates rules for rightward and leftward combination of words.
FIG. 8 is a tree structure for an English sentence comprising the words in the table of FIG. 6.
Figures 13, 14, 15, 16, 17, 18, 19:
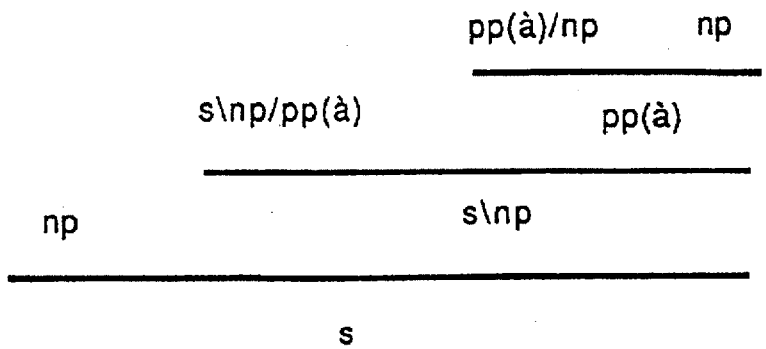
FIG. 13 shows a tree structure for the French translation of the English sentence whose tree structure is shown in FIG. 8.
FIGS. 14 to 19 show successive steps in a known shift-reduce parsing technique.

Before presenting the algorithm we introduce as an alternative notation for grammars written in the categorial style, one suggested by Carpenter. As a piece of terminology we distinguish between categories, which are types like np or s, and signs which are the different tokens which belong In this notation we begin with a finite set BasCat of basic categories and define the full set of categories Cat to be the smallest collection of objects of the form $b[c_0,c_1 \ldots c_{n-1}]$ where $b \in$ BasCat and $c_i \in$ Cat for i <n. The categories in the square brackets are the arguments of the rule. We will refer to the category outside the square brackets as the functor and the list of elements in square brackets as the arglist. Categories are combined by means of a single schematic phrase structure rule, which builds a new category by allowing heads to combine with a single complement. The rule can be stated as in FIG. 34.

This says that the mother category[1] in a phrase structure tree is formed by matching the first element of the argument list of one category against the other category which participates in the rule. For example, transitive verbs (with category s[np,np]) have categories entirely equivalent to categories of the form s\np/np in the Steedman notation, and therefore combine with an object np followed by a subject np. This framework differs from the categorial system only in that the direction of combination has not yet been specified; nothing about s[np,np] tells us that the first noun-phrase is sought to the right of the verb and the second is its left.

[1] By analogy with family trees, a node has a mother if the mother is directly above the daughter in the phrase marker representation. It is conventional to ignore the male lineage.

For the purposes of the next section we also need the idea of the nesting level of a sign, which is defined as the number of brackets which separate the sign from the top level of the bag.

3.3.1. The algorithm

Our new algorithm relies on the ability to break a bag of signs into its component basic signs, and arranges these signs according to their nesting level. We then organise these basic signs in a graph structure within which two nodes are linked if and only if Their nesting levels differ by exactly one.

They arise from different lexical items

These are necessary but not sufficient conditions for two basic signs to participate in a reduction during a completed derivation. In the example of the fierce brown cat we obtain the information about levels which is shown in FIG. 35

In order to make the solution procedure as simple as possible, it is convenient to add to the input bag a representation of the fact that a particular target category is being sought. This is the reason for the presence of the dummy np in FIG. 35. The next step is to construct an adjacency list representation of the graph structure by associating each instance of a basic category with a bag containing exactly those elements of the structure which might match it. This produces the following constraint graph in which "=>" is to be read as "potentially the functor of", "<=" means "potentially the argument of" and ";" is used in the Prolog style to represent disjunction. The result of this is FIG. 36.

An equivalent representation is the graphical one given in FIG. 37. This structure is a directed graph, in which elements are linked if and only if they may stand in a functor/argument relationship. We know that each node of the structure must participate in exactly one functor/argument relationship, but in order to distinguish between those elements which may stand in such a relationship and those which actually form part of a complete solution, it is necessary to propagate constraints.

When we examine a structure like the one shown in the picture, we will typically find that there are several locations at which a particular connection is forced upon us. In the example this happens for the connection between node 1 and node 0, the one between node 3 and node 2 and the one between node 8 and node 9. We can therefore carry out the corresponding unifications, and update the diagram to exclude options which can no longer be taken. The process bears a family resemblance to a number of well-known algorithms defined over graphs. This resemblance can be further enhanced by the inclusion of the dotted lines shown in the FIG. 38. The dotted lines associate nodes which arise from the same lexical items.

Once we have deleted the lines and columns which have already been resolved, we have the symbolic representation in FIG. 39 and the graphical representation shown in FIG. 40

Figures 41, 42:
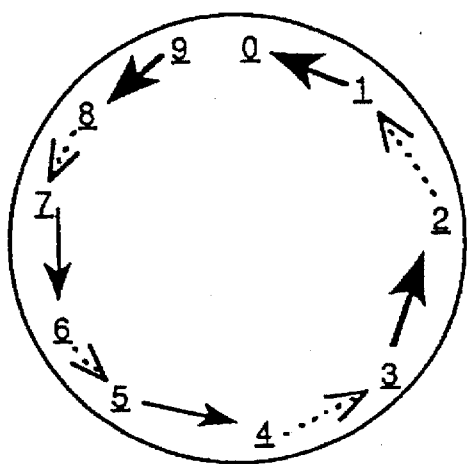

The resulting system can once again be simplified, yielding FIGS. 41 (the symbolic representation) and 42 (the graphical representation). In this example the constraint solving process has found a Hamiltonian cycle in the directed graph originally seen in FIG. 38.

In this example the constraints encoded in the graph are sufficient to drive the analysis to a unique conclusion, but this will not always be so; general solutions require a search mechanism. We need an algorithm for systematically exploring the ways in which elements can be combined. A shift-reduce parser is suitable; it turns out that a small modification to Whitelock's parser yields a new and surprisingly efficient parser, which is particularly suitable for implementation in special purpose hardware. This is described by the schematic Prolog program in FIG. 43.

The new facilities of this program are the ability to construct an initial constraint graph from the input bag using new_constraint_graph/2 (e.g., new_constraint—graph (Begin, G) as shown in FIG. 43), and the ability to inform the constraint solving system of a unification proposed by the parser, which is implemented by update/2 (e.g., update (Info, G) as shown in FIG. 43). The constraint solver will update its data structures, making any inferences which are possible, but (crucially) the update/2 predicate will fail whenever it runs against a situation in which it has determined that a solution cannot be found. Because of the way Prolog works, this forces the system to fall back on the consideration of an alternative other than the one which prompted the constraint failure.

3.3.2 Alternative graph algorithms

We now return to the issue raised in the earlier section, where we noted the similarity between Shake-and-Bake generation for a particular instance and the enumeration of Hamiltonian paths. We commented that we did not know of a simple mapping between the Hamiltonian path problem and the Shake-and-Bake algorithm, and left open the question of how it might be possible provide the dotted construction lines which made the correspondence possible in the relatively simple case with which we were dealing. We now provide an example which illustrates the difficulty. The test sentence is "John believes Fred loves Mary". The lexical entry for "believe" is s[s np] and the entries for "Fred" and "John" are each np. The adjacency list representation for these elements is that in FIG. 44.

In this example we have left a considerable degree of ambiguity, since the grammar is once again inadequate, and the items can be assembled into any one of a set of six possible sentences, depending on the allocation of the rules of believer, lover and loved between the participants. This does not affect the current point, and simplifies discussion. The graphical representation of the same data is shown in FIG. 45.

In this example we can also add construction lines linking elements springing from the same lexical entries. The result of this is shown in FIG. 46.

Once constraint propagation has been completed, we will end up with (among others) the generation result "John believes Fred loves Mary", in which the unifications shown in FIG. 47 will have been carried out. This will pick out the sub-graph in FIG. 48 from the original graph Technically FIG. 48 is a spanning tree of FIG. 46: that is, a tree structure constructed from edges of the original graph, satisfying the constraint that the tree contains every node of the graph. A Hamiltonian path is a special case of a spanning tree. Efficient algorithms exist for finding spanning trees. In fact, for our purposes we are interested in a tightly defined subset of the possible spanning trees, since we need the ones which branch at a node if and only if the lines leaving that graph are dotted construction lines (i.e. those which link elements of the same lexical items). In the second form of the invention, the constraint solving component (also referred to herein as the constraint checking module) has the task of enumerating these spanning trees, while the structure building component (also referred to herein as the tree building module) carries out the unifications which are suggested by the constraint solving component.

We have explained the invention using software, but the invention is a specially designed piece of hardware in which the generator and the constraint solver operate in parallel once the input bag has been constructed. These processors need only communicate when the generator proposes a reduction and the constraint solver needs to update its constraint network. The preferred embodiment is a blackboard architecture in which the two modules share some but not all of their addressable memory, which they use to record proposed reductions and the response of the constraint solver to such reductions.

4. Effects of the invention in the context of the background art

Because it is now possible to carry out constraint checking before entering the computationally demanding portion of the generation process, it becomes feasible to generate longer and more complex sentences than has previously been the case. Constraint checking is a part of the generation process which involves a different form of computation to that which is needed for the remainder of the process, so a machine translation system which uses this technique will typically consist of the following components, as illustrated in FIG. 49.

The preferred embodiment consists of the following components

An input device or devices (A)

An analysis module (B)

An equivalencing module (C)

A constraint checking module (D)

A tree building module (E)

An output device or devices (F)

The preferred embodiment of this invention is described by, but not limited to, an implementation in hardware of the algorithms which are implemented by the software programs presented in this section.

5.1. Programs

We provide a simple Prolog implementation of the count constraint checking ideas as described in the rest of the application. The implementation uses the Quintus Prolog software system to emulate the behaviour of the hardware system which is claimed. For a tutorial introduction to Prolog and its capabilities see William F. Clocksin and Christopher S. Mellish "Programming in Prolog", 3rd Edition, Springer Verlag, 1987. We document each interesting Prolog predicate[2] by providing a header of the general form

```
%%
% append(A,B, AB)
% true when A and B are lists and AB is the concatenation of A and B
%%
```

[2] Uninteresting Prolog predicates don't get a header, because they are part of the implementation of an interesting predicate, and will never be called from elsewhere.

Such headers may also contain mode annotations to indicate the way in which the arguments are assumed to be instantiated when the predicate is called. The header information forms a kind of contract between the implementer of the predicate and the potential users, since the implementer does not undertake that the predicate has been tested except insofar as it has been used in the manner described. Where more detailed commentary is required, it is provided in sections of the following form

```
/*
This is a long comment intended to give general information about the way the algorithm has been implemented in Prolog. It might go on for far longer than a procedure header.
*/
```

We use the software implementation as a communication aid, in order to make credible the claim that the our invention can indeed perform as expected: the claimed invention is the hardware implementation not the software presented here.

5.1.1. The count constraint mechanism

```
/*
The module declaration in the next few lines states which predicates this module provides for use by other modules. This module implements a con-
straint manager which is used by the main procedures stored in the solver. It provides for the construction of a new constraint graph, for the propagation of constraints through that graph, and a communications predicate which allows the tree building module to tell the solver about a decision which may spark off a new round of constraint propagation. This last predicate emulates the functionality of the hardware link between the constraint solver and the tree builder.
*/
:- module(constraint_solver, [
    new_constraint_graph/2,
    % construct a new graph from a bag of signs
    propagate/2,
    % deduce what must be
    % true about all solutions which arise from the
    % current state.
    comms_channel/2
    % communications channel between constraint solver and
    % tree builder
]).
:- use_module(library(basics)).
:- use_module(library(maplist)).
:- use_module(lexicon).
:- use_module(lexutils).
%%
% count_structure(+Object, -PositiveElements, -NegativeElements)
% true when Object is a Sign or a list containing Signs
% PositiveElements is a list of the basic Signs which make
% a positive contribution to the count for a general sign
% NegativeElements is the corresponding collection of signs
% which make a negative contribution.
%%
count_structure(Sign, [v(_,Sign)], []) :-
```

```
bascat(Sign, _),!.
count_structure(Sign, [v(_,Cat)|Positives], Negatives) :-
    nonbasic(Sign, Cat, ArgList),!,
    count_structure(ArgList, Negatives, Positives).
count_structure([], [], []).
count_structure([X|Xs], Positives, Negatives) :-
    count_structure(X, Pos1, Neg1),
    count_structure(Xs, Pos2, Neg2),
    append(Pos2, Pos1, Positives),
    append(Neg2, Neg1, Negatives).
%%
% count_structure_with_target(+Signs, -TopSigns, -BottomSigns)
The procedure count_structure_with_target includes a negative contribution from a guessed target category. This is useful, because it means the constraint solver can then assume that everything will balance.
%%
count_structure_with_target(Signs, TopSigns, BottomSigns) :-
    count_structure(Signs, S1, S2),
    target_category(Sign),
    annotate(Sign, -1), % string position of -1 for the target
    count_structure(Sign, S3, S4),
    append(S1, S4, TopSigns),
    append(S2, S3, BottomSigns).
select_from_list(v(Index,S1), Candidates, 'C' (v(Index,S1),Result)) :-
    select2(S1, Candidates, Result).
select2(_,S1, [], []).
select2(S1, [v(I2,S2) | Cs], [v(I2, S2) | Rest]) :-
    bascat_test_unify(S1, S2),
    !,
    select2(S1, Cs, Rest).
select2(S1, [_|Cs], Result) :-
    select2(S1, Cs, Result).
The procedure constraint_graph_half associates with each element of a count structure a list of the elements from the other half which it may combine with.
constraint_graph_half ([], _, []).
constraint_graph_half ([E|Es], OtherHalf, [Result|Results]) :-
    select_from_list(E, OtherHalf, Result),
    constraint_graph_half(Es, OtherHalf, Results).
constraint_graph(Signs, cgraph(Half1,Half2)) :-
    count_structure(Signs, S1, S2),
    constraint_graph_half(S1, S2, Half1),
    constraint_graph_half(S2, S1, Half2).
constraint_graph_with_target(Signs, cgraph(Top, Bottom)) :-
    count_structure_with_target(Signs, TopSigns, BottomSigns),
    constraint_graph_half(TopSigns, BottomSigns, Top),
    constraint_graph_half(BottomSigns, TopSigns, Bottom).
% select_usable(+Constraint,-Usable) -- get all the possibly usable elements from a constraint
%
select_usable('C'(_,List), Usable) :-
    select_usable(List, Usable).
select_usable([], []).
select_usable([v(I,X)|Xs], [v(I,X)|Ys]) :-
    var(I),
    select_usable(Xs, Ys).
select_usable([v(I,_)|Xs], Ys) :-
    nonvar(I),
    select_usable(Xs,Ys).
%%
% resolved(+Constraint) -- true if Constraint is resolved on this
% reduction, only one option available
% as a side effect we carry out the appropriate unification.
%%
resolved('C'(v(I,X1),Possible)) :-
    var(I),
    select_usable(Possible, [v(I,X2)]),
    bascat_unify(X1, X2,_),
    I = done.
% A constraint is insoluble if it is not yet resolved, but no more alternatives
% are available from the constraint list.
insoluble('C'(v(I,X1),Possible)) :-
    var(I),
    select_usable(Possible, []).
%%
% find_constraint_and_resolve(+ConstraintList,-Status)
% ----------------------------------------------------
% first clause succeeds if nothing left to do
% second clause succeeds if it can do something, fails if constraints are
```

```
found_insoluble
% third clause succeeds when something remains to be done, but the
count
constraints
% don't yet tell us what this something is.
find_constraint_and_resolve(ConstraintList, done) :-
    all_done(ConstraintList),!.
find_constraint_and_resolve(ConstraintList,resolved) :-
    member(Constraint, ConstraintList),
    (insoluble(Constraint),!,fail;resolved(Constraint),!).
find_constraint_and_resolve(_,blocked).
% all done -- succeeds when all constraints have been resolved
all_done([]).
all_done[('C'(v(I,_),_)|Rest]) :-
    nonvar(I)
    all_done(Rest).
% propagate (+ConstraintSystem, -ReturnValue)
% ------------------------------
% If we can resolve a constraint in the top half, do so
propagate(cgraph (Top, Bottom), ReturnValue) :-
    find_constraint_and_resolve(Top,Status),
    (Status == blocked -> ReturnValue = blocked
    ;Status == resolved -> propagate(cgraph(Top, Bottom), ReturnValue)
    ;Status == done -> ReturnValue = done
    ).
new_constraint_graph(FromLexicon, Graph) :-
    remove_orthography(FromLexicon, Signs),
    constraint_graph_with_target (Signs, Graph).
%%
% tell_constraint solver(+Graph, +SharedSign)
% ------------------------------
% called by the parser to tell the constraint solver that
% a particular sign has been unified in the course of reduction.
% Now scan the graph looking for signs which are identical to this
% apart from the string position, and mark them as used in the graph
%%
comms_channel(cgraph(Top, Bottom), Merged) :-
    bascat(Merged, Cat),
    maplist(update_constraint(Cat),Top),
    maplist(update_constraint(Cat),Bottom).
update_constraint(X,'C'(v(I,Value),_)) :-
    bascat(Value,X1),
    (X1 == X
    -> I= done
    ; true
    ).
```

5.1.2. Lexical utilities

```
:- module(lexutils, [test/3,
    bascat/2,
    nonbasic/3,
    bascat_unify/3,
    bascat_test_unify/2,
    annotate/2,
    direction/2,
    cat_unify/3]).
:- meta_predicate test(+,:,-).
:- use_module(library(lists)).
:- use_module(library(maplist)).
:- use_module(library(addportray)).
:- use_module(library(call)).
:- use_module(lexicon).
% primitives for HPSG style signs.
% ------------------------
nonbasic(sgn(Cat, ArgList, _Dir) , Cat, ArgList).
bascat(sgn(Cat, _Dir)=_, Cat).
direction(sgn(_,_,Dir)=_, Dir).
direction(sgn(_,Dir)=_, Dir).
annotate (Sgn,N) :-
    nonbasic(Sgn,Basic, ArgList),
    annotate (Basic,N),
    annotate (ArgList,N).
annotate([],_).
annotate([S|Ss],N) :-
    annotate(S,N),
    annotate(Ss,N).
annotate (Sgn,N) :-
    bascat(Sgn,_),
    Sgn = (_ = N).
sign(Sign) :- basic(Sign,_) ; nonbasic(Sign,_,_).
bascat_unify(Sign=_, Sign= _, Sign= _).
bascat_test_unify(S1=N1,S2=N2) :-
    N1 =\= N2, \+ (\+ S1 = S2).
bascat_unify(Sign=N1, Sign=N2, Sign= _, N3) :-
    N3 is N1 - N2.
bascat_anti_unify(Sign1= _,Sign2= _, Sign3= _) :-
    anti_unify(Sign1, Sign2, Sign3).
cat_unify(Sign1, Sign2, Sign3) :-
    bascat(Sign1,_),
    bascat(Sign2,_),
    bascat_unify(Sign1, Sign2, Sign3).
cat_unify(Sign1, Sign2, Sign3) :-
    nonbasic(Sign1, Bas1, Args1),
    nonbasic(Sign2, Bas2, Args2),
    bascat_unify(Bas1, Bas2, Bas3),
    maplist(cat_unify,Args1, Args2, Args3),
    nonbasic(Sign3, Bas3, Args3).
% example(Ex) -- Ex is a phrase to be tested
example(1, [fox, a]).
example(2, [cat, the]).
example(3, [yellow,a,fox]).
example(4, [brown,the,cat]).
example(5, [a,tame,fox, yellow]).
example(6, [the,fierce,cat, brown]).
example(7, [a,tame,fox, big,yellow]).
example(8, [the,fierce,cat, little, brown]).
example(9, [the,cat,a,likes,fox]).
example(10, [the,fierce, a, cat,likes, fox]).
example(11, [the,fierce, a, cat,likes,tame, fox]).
example(12, [the,little,cat,brown,likes,a,yellow,fox]).
example(13, [fierce,the,little,brown,cat,likes,a,yellow,fox]).
example(14, [fierce,little,the,brown,cat,likes,a,tame,yellow,fox]).
example(15, [fierce,little,big,the,brown,cat,likes,a,tame,yellow,fox]).
example(16, [little,big,the,brown,cat,likes,a,yellow,fox]).
test (N,Proc,Result) :-
    example(N,Ex),
    lookup(Ex,Signs),
    call(Proc,Signs,Result).
```

5.1.3. lexicon

```
:- module(lexicon, [lookup/2,
    rule/5,
    target_category/1]).
:- use_module(lexutils).
% lexical lookup, with annotation of signs to carry position of occurrence
lookup(Words, Signs) :-
    lookup(Words,Signs, 0).
lookup([], [],_).
lookup([Word|Words], [[Sign,Word]|Signs],N) :-
    lex(Word, Sign,N),
    N1 is N+1,
    lookup(Words,Signs, N1).
lex(Word, Sign,N) :-
    lex(Word,Sign),
    annotate (Sign,N).
rule(Mother,Daughter, NewMother, Merged, right) :-
    nonbasic(Mother, Basic, [Arg|Args]),
    direction(Arg, right),
    cat_unify(Arg,Daughter,Merged),
    (Args = []
    -> NewMother = Basic
    ; nonbasic(NewMother, Basic,Args)
    ).
rule(Mother, Daughter, NewMother, Merged, left) :-
    nonbasic(Mother, Basic, [Arg|Args]),
    direction(Arg, left),
    cat_unify(Arg,Daughter,Merged),
    (Args = []
    -> NewMother = Basic
    ; nonbasic(NewMother, Basic,Args)
```

-continued

```
).
% ---- Specifications of possible target categories ----
target_category(Sign) :-
    bascat(Sign, s).
target_category(Sign) :-
    bascat(Sign, np(_)).
% ---- Abbreviations used in the lexicon -------
determiner(Sign, Index) :-
    nonbasic(Sign, S1, [S2]),
    bascat(S1, np(Index)),
    bascat(S2, n(_,Index)),
    direction(S2, right).
modifier(Sign,Top, Act) :-
    nonbasic(Sign, S1, [S2]),
    bascat(S1, Top),
    bascat(S2, Act),
    direction(S2, right).
verb(trans,Sign, Experiencer, Theme) :-
    nonbasic(Sign,S, [X1,X2]),
    bascat(S,s),
    bascat(X1, np(Theme)),
    direction(X1, right),
    bascat (X2, np(Experiencer)),
    direction(X2, left).
% ---- Beginning of main body of lexicon -------
lex(the,Sign) :-
    determiner(Sign,+c).
lex(a,Sign) :-
    determiner(Sign,+f).
lex(fierce,Sign) :-
    modifier(Sign, n(f,+c), n(1b(_),+c)).
lex(big ,Sign) :-
    modifier(Sign, n(f,+f), n(1b(_),+f)).
lex(little,Sign) :-
    modifier(Sign, n(1b(1),+c), n(1b(_),+c)).
lex(tame,Sign) :-
    modifier(Sign, n(1b(1),+f), n(1b(_),+f)).
lex(brown,Sign) :-
    modifier(Sign, n(1b(b),+c), n(c,+c)).
lex(yellow,Sign) :-
    modifier(Sign, n(1b(b),+f), n(c,+f)).
lex(cat,Sign) :-
    bascat(sign,n(_,+c)).
lex(fox,Sign) :-
    bascat(Sign,n(_,+f)).
lex(likes, Sign) :-
    verb(trans, Sign,+c,+f).
```

6.1.4 Tree builder

```
:- module(tree_builder,[ testpw/3, testcb/3]).
:- use_module(library(lists)).
:- use_module(library(basics)).
:- use_module(library(sets)).
:- use_module(library(call)).
:- use_module(lexicon).
:- use module(constraint_solver).
:- use module(lexutils).
reduce ([FunctorIFunctorOrth],
        [ArgumentIArgumentOrth],
        [Result ResultOrth], Merged) :-
    rule(Functor,Argument,Result, Merged, Dir),
    call(Dir,FunctorOrth,ArgumentOrth,ResultOrth).
reduce([ArgumentIArgumentOrth],
       [FunctorIFunctorOrth],
       [ResultIResultOrth], Merged) :-
    rule(Functor,Argument,Result, Merged, Dir),
    call(Dir,FunctorOrth,ArgumentOrth,ResultOrth).
left(FunctorOrth, ArgumentOrth, ResultOrth) :-
    append(ArgumentOrth,FunctorOrth,ResultOrth).
right(FunctorOrth, ArgumentOrth, ResultOrth) :-
    append(FunctorOrth, ArgumentOrth, ResultOrth).
pw(Bag,Targetsigns) :-
    init_reductions,
    findall(TargetSign,
        pw_shake_and_bake ([],TargetSign,Bag,[]),TargetSigns).
```

```
% pw_shake_and_bake(Stack,output,BagIn,BagOut).
pw_shake_and_bake([Sign],Sign,[], []) :- !.
pw_shake_and_bake([AIStack],Sign) -->
    {select(B,Stack,Stack1),
    reduce(A,B,C,_1)},
    pw_shake_and_bake([ClStack1],Sign).
pw_shake_and_bake(Stack,Sign) -->
    [Next],
    pw_shake_and_bake([NextIStack],Sign).
testpw(Example, Result,N) :-
    test(Example, pw, Result),
    length(Result,N).
cb(Bag,TargetSigns) :-
    new_constraint_graph(Bag,G),
    propagate(G,_),
    findall(TargetSign,
        cb_shake_and_bake([],TargetSign,G,Bag,[]),TargetSigns).
% cb_shake_and_bake(Stack,Output,G,BagIn,BagOut).
cb_shake_and_bake([Sign],Sign,_G,[], []) :- !.
cb_shake_and_bake([AIStack],Sign,G) -->
    {select(B,Stack,Stack1),
    reduce(A,B,C, Merged),
    comms_channel(G,Merged),
    propagate(G,_)},
    cb_shake_and_bake([ClStack1],Sign,G).
cb_shake_and_bake(Stack,Sign,G) -->
    [Next],
    cb_shake_and_bake([NextIStack],Sign,G).
testcb(Example, Result,N) :-
    test(Example, cb, Result),
    length(Result,N).
```

5.2. Performance

We know that the task of Shake-and-Bake generation is a member of the class of hard problems which are referred to as NP-complete. This is primarily a result of mathematical interest, but it also has major practical significance, since it is widely accepted that no algorithm will always be able to solve such problems with acceptable efficiency in the general case. This means that it is highly unlikely that any given algorithm will out-perform any other for all possible cases of a general problem, but leaves open the possibility of wide differences in performance in practical situations.

For this reason our analysis of the performance of the algorithms is based on empirical study rather than theoretical principle. We have simulated the problems which would arise in the generation of several sentences about a fierce little brown cat and a tame yellow fox. These examples were chosen because they represent a class of inputs which cause particular difficulties for the algorithms proposed by Whitelock, and because they are representative of a class of phenomena which are prevalent in natural languages. Since no algorithm is likely to prove consistently better than any other for all inputs, it will also be possible to construct inputs for which Whitelock's algorithm is preferable, but these inputs will not correspond to the inputs which will be faced by a practical machine translation system.

FIG. 50 shows the number of reductions carried out by each algorithm for sixteen example sentences. The first column gives the examples which were used, the second gives the length of the sentence in words, the third gives the number of reductions which were attempted by Whitelock's original algorithm, and the fourth gives the number of reductions which were attempted by the algorithm which uses constraint propagation.

In spite of the high overhead introduced by the admittedly inefficient implementation of the constraint solver, the overall performance of the second algorithm was also approximately twice that of the original when measured in real time.

This time would be markedly improved by the implementation of the constraint solver in the special purpose hardware which is the subject of the current invention.

5.3. Hardware configuration

The current invention operates by reading a text from an input source (such as a keyboard, telephone line, optical character reader or computer data file), then entering that text into an analysis module, which processes the text by drawing on information from source language grammars, dictionaries and other knowledge sources provided in the system to deduce information about the usage and meaning of the words of the source language text as they occur in context. This information is collected in repositories which are associated with the individual morphemes of the input text.

The information repositories which have been constructed and stored in the buffer of the analysis module are then passed to an equivalencing module, which matches them against the source language sides of a set of bilingual equivalence statements provided within the system. The matching of the source language side of the equivalence statements causes the equivalence module to produce as output a set of information repositories describing words of the target language.

The target language information repositories are then passed to a generation module which will construct either a single target language text or a plurality of target language texts, such that these texts are possible translations of the source language text. The generation module has internal structure, consisting of a constraint checking module and a tree construction module. In the preferred embodiment the target language information repositories are simultaneously fed to both the constraint checker and the tree building module, which operate in parallel to produce a set of candidate translations of the original text.

The translated texts are then made available to the user by conveying them to an accessible location, such as a screen, a printer or a second computer file, and optionally by initiating a structured interaction during which the user can explore the alternative translations which the system has produced.

6. Industrial applicability

The machine translation system which forms the current invention is of direct practical benefit to anyone who has need of translations between languages for which human translators are rare, costly, unreliable or unavailable. The system as described improves on the state of the art by making it possible to translate longer and more complex sentences using available computational and physical resources.

I claim:

1. A machine translation system, comprising:

means for reading a source language text including source language words from an input source, an analysis module for processing the text by drawing on information from at least one of source language grammars and dictionaries provided in the system to deduce source word information about the usage and meaning of the source language words of the source language text as they occur in context, means for entering said text into the analysis module;

means for matching the source language words against source language sides of a set of bilingual equivalence statements provided within a bilingual dictionary of the system, the bilingual equivalence statements being rules that a word or words on a source language side corresponds to or translates as a word or words in a target language side, means for collecting target language words obtained as a result of said matching performed by said matching means, generation module means included in said system for combining target word information collected by said means for collecting to construct one or more candidate target language texts corresponding to the source language text and the deduced source word information, and characterized in that the generation module means is split into first and second separate functional components, the first of which is dedicated to the processing of information which is independent of the eventual order of words in the target language text and the details of associations between the component parts of the target language words, and the second of which is dedicated to the construction of structures which respect constraints of word order, associations between the words of the target language text and the deduced source word information, and wherein the first functional component verifies that the constructed structures are part of a global structure which incorporates all the target language words introduced during the matching via the bilingual equivalence statements, and in that the second component communicates with the first component in order to synchronize the construction and verification of the structures.

2. A machine translation system according to claim 1, further characterised in that the first component is operable to implement a constraint propagation algorithm to assist in the direction of the operation of the second functional component by communicating to the second functional component a failed constructed structure, thereby ensuring that the failed constructed structure not be constructed again and eliminating a portion of a structure construction space that cannot lead to a solution.

3. A machine translation system according to claim 1, further characterised in that the first component uses standard graph algorithms to test for the existence of spanning trees containing one or more edges proposed by the second component, failing when no such spanning tree can be constructed and communicating to the second functional component a failed edge proposal, thereby ensuring that the failed edge proposal will not be proposed again and eliminating a portion of a spanning tree edge proposal space that cannot lead to a solution.

4. A method for translating from a source language to a target language, comprising:

(A) reading a text of said source language;

(B) entering said source language text into an analysis module;

(C) processing said source language text with the analysis module by drawing on information from at least one of source language grammars and dictionaries to deduce source word information about the usage and meaning of the words of said source language text as they occur in context;

(D) matching the source language words against source language sides of a set of bilingual equivalence statements provided within a bilingual dictionary, the bilingual equivalence statements being rules that a word or words on a source language side corresponds to or translates as a word or words in a target language side;

(E) collecting target language words obtained as a result of said matching procedure;

(F) combining target word information collected in (E) by way of a generation module to construct one or more target language texts corresponding to said source language text and the deduced source word information, said generation module having first and second functional components;

(G) processing information which is independent of the eventual order of words in said target language text or on the details of associations between the component parts of the target language words in said first functional component;

(H) constructing structures which respect constraints of word order and associations between the words of the target language text in said second functional component;

(I) verifying that the constructed structures are part of a global structure which incorporates all the target language words during matching via the bilingual equivalence statements in said first functional component; and (J) synchronizing the first and second components in the steps (G), (H) and (I) to construct said one or more target language texts corresponding to said source language text.

5. A method according to claim 4 further comprising implementing a constraint propagation algorithm in said first functional component for assisting in the direction of the operation of said second functional component by communicating to the second functional component a failed constructed structure, thereby ensuring that the failed constructed structure not be constructed again and eliminating a portion of a structure construction space that cannot lead to a solution.

6. A method according to claim 4 further comprising using standard graph algorithms in said first functional component to test for the existence of spanning trees containing one or more edges proposed by said second functional component, and failing when no such spanning tree can be constructed and communicating to the second functional component a failed edge proposal, thereby ensuring that the failed edge proposal will not be proposed again and eliminating a portion of a spanning tree edge proposal space that cannot lead to a solution.

* * * * *